C. E. PHELPS.
Tobacco Hangers.
No. 133,541.          Patented Dec. 3, 1872.
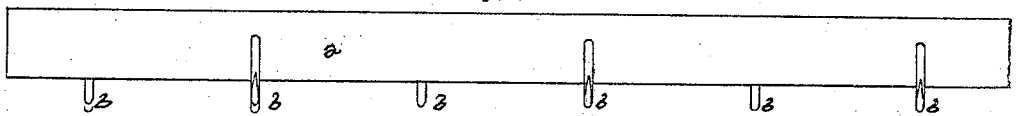
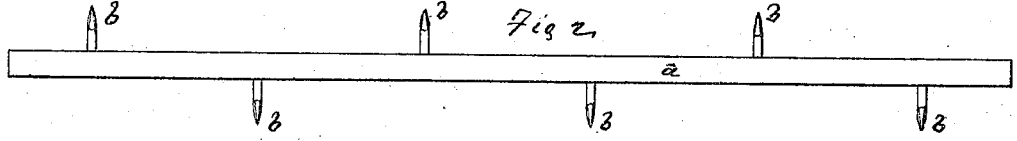
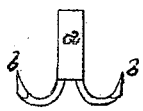
Witnesses.
T. E. Steele
E. A. Kunkel
Inventor.
Charles E. Phelps
By W. E. Simonds
Atty

UNITED STATES PATENT OFFICE.

CHARLES E. PHELPS, OF WAREHOUSE POINT, CONNECTICUT.

IMPROVEMENT IN TOBACCO-HANGERS.

Specification forming part of Letters Patent No. 133,541, dated December 3, 1872.

*To all whom it may concern:*

Be it known that I, CHARLES E. PHELPS, of Warehouse Point, in the county of Hartford and State of Connecticut, have invented certain new and useful Improvements in Tobacco-Sticks, of which the following is a specification, reference being had to the accompanying drawing, in which—

Figure 1 is a side view of the same; Fig. 2 is a top view of the same; and Fig. 3 is an end view of the same.

The most common method of hanging tobacco-plants after they are harvested in from the field where the tobacco is grown is to tie a stout cord around the butt of the stalk and then suspend the plant, by means of the cord, from poles placed horizontally and properly elevated, the plants hanging tip downward from the pole. This method causes a great waste of cord and consumes a great deal of time. Another method has come into use somewhat, practiced as follows: Strips of wood about four feet long are provided, generally about three-eighths of an inch thick and an inch and a quarter wide; practically, tobacco-raisers generally use the common sawed lath as it is furnished for house-builders' use. An iron needle, about six inches long, is then provided, having a socket at the base which will just fit upon the end of the lath. The opposite end of the lath is then inserted in a proper socket in a post or the like, so as to hold out the lath horizontally. The needle is then slipped upon the projecting end of the lath and the stalks of the plants are then spitted upon the lath by running the needle through the stalk, and thus drawing the stalk onto the lath. After one lath is filled up with stalks the needle is stripped off and the lath is suspended by its ends upon the poles, and the same operation is repeated with other laths to any desired extent.

This latter method—while it is a great gain, in some respects, over the old method of hanging with cord—has serious drawbacks. In order to thus spit the stalks upon the lath the stalk must be grasped with both hands, both above and below the point at which the needle enters the stalk and the lower hand, by its grasp, often injures the largest and finest leaves on the stalks and sometimes breaks them quite off. Not only this, but the lath splits the stalk down for some six or eight inches, thus allowing the air to have access to the stalk, causing it to dry before the leaves, which injures the quality of the tobacco.

The purpose of my invention is to furnish a means of hanging tobacco which shall avoid all these defects.

I use a strip of wood or metal, $a$, preferably the lath in common use for this purpose, and to the sides I fix the hooks $b$, preferably of iron wire, sharpened on the point, and with the sides flattened so as to have no splitting tendency upon the stalks. The hooks on the two sides of the lath should not be exactly opposite each other, but the hooks on one side should alternate with the hooks on the other side.

By the aid of my invention a man can hang almost double the number of plants than when using either of the old methods, and avoid all danger of injuring it, and in the end get a better quality of tobacco.

I claim as my invention—

An independent strip, $a$, provided with hooks $b$ on both sides, said hooks being pointed, and having flattened sides, to enter the tobacco-stems without splitting them, said strip being adapted for adjustment and removal from supports in the drying-house, substantially as described.

CHAS. E. PHELPS.

Witnesses:
 WM. E. SIMONDS,
 HARRISON T. FREEMAN.